United States Patent [19]

Pelsy

[11] 4,290,488
[45] Sep. 22, 1981

[54] DRIVING MACHINE INCLUDING SPEED SYNCHRONIZED EARTH WORKING TRACTION WHEEL

[76] Inventor: Gilles Pelsy, Ferme de l'Epina, 55400 Maucourt/Orne, France, 55400

[21] Appl. No.: 94,334

[22] Filed: Nov. 14, 1979

[30] Foreign Application Priority Data

Dec. 5, 1978 [FR] France ................................ 78 34251

[51] Int. Cl.³ ........................ A01B 33/02; A01B 33/10
[52] U.S. Cl. .................................... 172/123; 172/125; 172/713
[58] Field of Search ............... 172/123, 125, 713, 105, 172/125, 114, 21

[56] References Cited

U.S. PATENT DOCUMENTS 3,120,279  2/1964  Horowitz ........................ 172/123 X

FOREIGN PATENT DOCUMENTS 693077  6/1953  United Kingdom ................ 172/123

*Primary Examiner*—George J. Marlo

*Attorney, Agent, or Firm*—Mason, Fenwick & Lawrence

[57] ABSTRACT

The invention relates to a public works machine constituted by a frame, by moving members with which the said frame rests on the grounds, by a device for driving the said moving members and, by a wheel provided with teeth for penetration into the ground, which wheel is mounted to rotate about a horizontal and transversal axis, and is coupled to a device for driving it into rotation whilst being adapted to be held in one position wherein the distance between the axis of the said wheel and the ground is less than the distance separating said axis from the free end of a tooth, whereas a synchronizing mechanism holds substantially constant the ratio of the rotation speed of the wheel to the linear speed of the moving members.

The profile of the active face of each tooth is an involute profile defined by the substantial lack of pressure exerted by said profile on the ground during the rotation of the wheel.

The invention finds an application in the production of channeling machines.

10 Claims, 11 Drawing Figures

DRIVING MACHINE INCLUDING SPEED SYNCHRONIZED EARTH WORKING TRACTION WHEEL

SUMMARY OF THE INVENTION

Currently known public works machines are all provided with a frame equipped with moving members such as wheels or caterpillar tracks.

The invention proposes such a machine, which, in new manner, is equipped with a multiple-effect toothed wheel : indeed to a main pulling effect, resulting from a kind of engagement of the teeth of the wheel into the ground, can be added a ground-digging and loosening effect leading to the production of trenches. In which case the machine may be one adapted for laying a cable inside such a trench.

The invention therefore relates to a public works travelling machine consisting of:

a frame, moving members, such as wheels or caterpillar tracks, by means of which the said frame rests on the ground, means for driving the said moving members, which means are coupled to the said moving members, a wheel, provided with teeth for penetration into the ground, which wheel is mounted for rotation about a substantially horizontal axis, generally transversal to the direction of travel of the machine, said wheel being coupled to a means for driving it in rotation and being adapted to be held in position with respect to the frame by means of a support in one position in which the distance between the rotation axis of said wheel and the ground is less than the distance separating the said rotation axis from the free end of a tooth, a synchronization means being also provided by keep substantially constant the ratio of the speed of rotation of the wheel to the linear speed of the moving members, one zone of each tooth having a linear speed which results from the speed of rotation of the wheel and which is substantially equal to that of the said moving members.

The profile of the active face of each tooth is an involute profile defined by the substantial lack of pressure exerted by said profile on the ground during the rotation of the wheel.

Advantageously, the following arrangements are adopted:

the said profile has a cross-section defined by the following polar coordinates:

$$\begin{cases} r \: S \: a_o/\sin t \\ S = S_o - t - (a_o/a) \times \operatorname{ctg} t \end{cases}$$

with:

$$\begin{cases} t \text{ varying between } t_o \text{ and } \pi/2; \\ R_o = a_o/\sin t_o \\ a : \text{rolling radius without sliding of the wheel;} \\ a_o : \text{depth of the surface layer of the ground of hard materials;} \\ R_o : \text{maximum radius of the wheel;} \\ r \text{ and } S, \text{ respectively, polar radius and angle;} \end{cases}$$

the wheel support is provided with a device for adjusting the position of its end that supports the wheel, with respect to the frame;

the said zone of each tooth is separate from the pointed end of said tooth;

the wheel is constituted by the fixing of individual teeth on at least a wheel disk and comprises a reinforcement ring for the tooth assembly, which ring is cut out in its centre so as to uncover one face of the wheel disk which constitutes the element joining the wheel to the means for driving it in rotation.

The invention will be more readily understood on reading the following description with reference to the accompanying drawings in which:

DETAILED DESCRIPTION OF THE DRAWINGS

Figure 1:
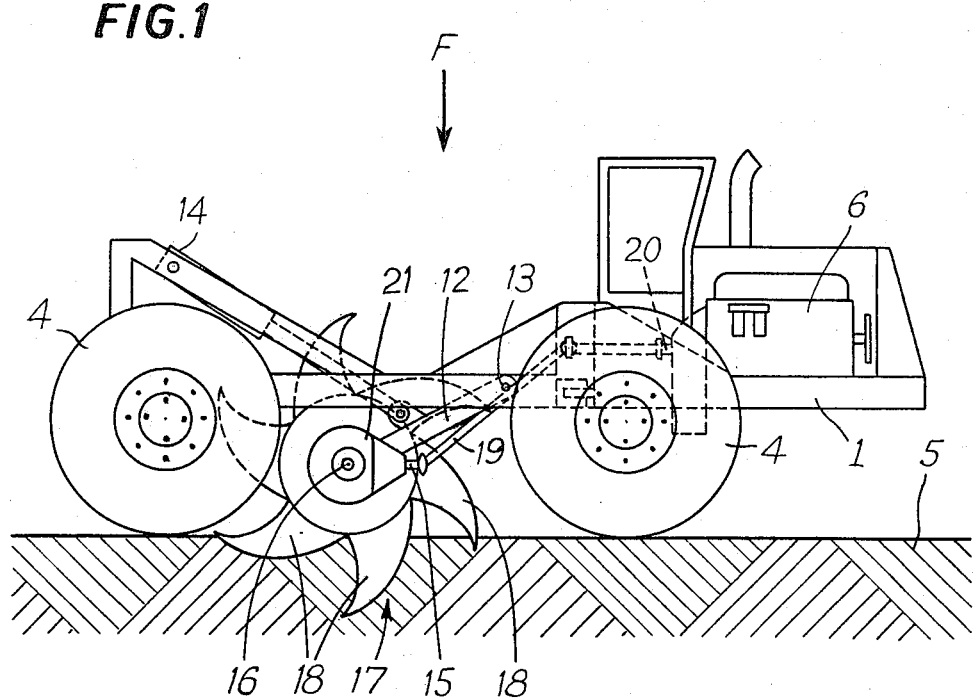
FIG. 1 is an elevational view of a first variant of embodiment of a machine according to the invention.
Figure 2:
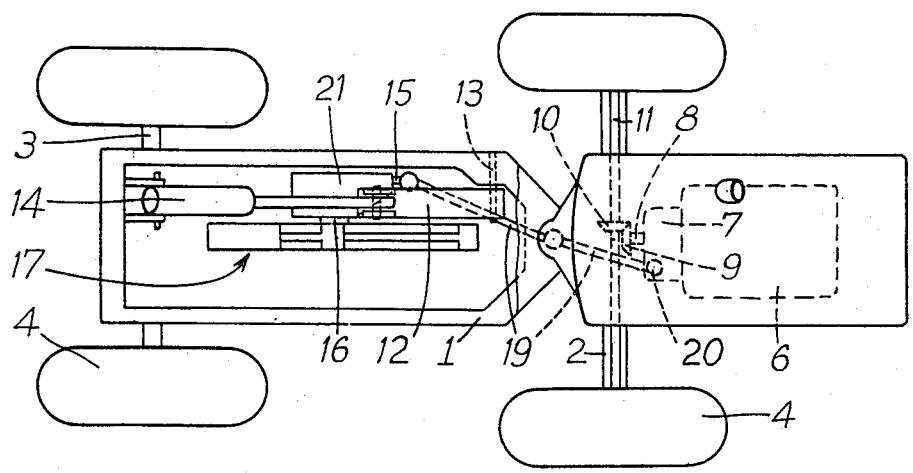
FIG. 2 is a view along arrow F of FIG. 1.

The machine shown in FIGS. 1 and 2 comprises:

a frame 1, two axles 2 and 3, provided with wheels 4, by means of which the said frame is resting on the ground 5, a "Diesel" type engine 6, mounted on the frame 1;

a gear box 7, coupled to the engine 6, the output shaft 8 of the gear box 7, with a pinion 9 fast therewith, meshing with a pinion 10, which is itself fast with the shaft 11 of the axle 2.

The shaft 11 drives the wheels 4 of the axle 2 in rotation. Moreover, an arm 12 is mounted to pivot with respect to the frame about a horizontal axis 13 and its position is controllable by means of a jack 14 coupled between said arm and the frame 1. On the free end of the arm 12 is mounted a transmission device 21 transmitting the rotation movement between an input shaft 15 and an output shaft 16. A wheel 17, provided with teeth 18 for penetration into the ground 5, is coupled in rotation to the output shaft 16, whereas, via transmission shafts 19, the input shaft 15 is connected to a power-output shaft 20 of the gear box 7.

It should be further noted that the speeds of rotation of the output shaft 8 and of the power-output shaft 20 of the gear box 7 are proportional, that the speeds of rotation of the input shaft 15 and output shaft 16 of the transmission device 21, are also proportional, so that the speeds of rotation of the wheels 4 of the axle 2 and of the toothed wheel 17 are proportional. The choice of the rotation speed of the wheel 17 will be specified hereinafter.

Figure 3:
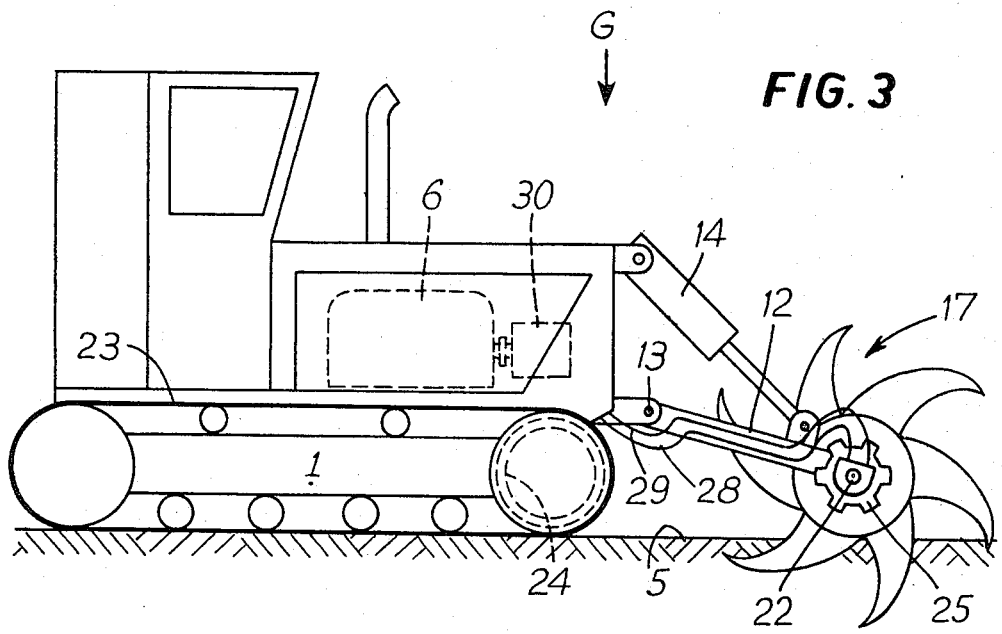
FIG. 3 is an elevational view of a second variant of embodiment of a machine according to the invention.
Figure 4:
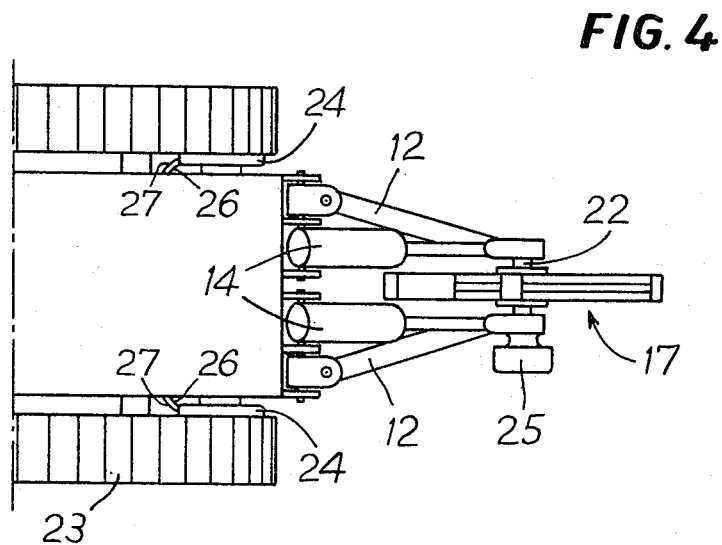
FIG. 4 is a view along arrow G of FIG. 3.

The machine illustrated in FIGS. 3 and 4 comprises several elements already defined hereinabove. These are the frame 1, the "Diesel" type engine 6, the arm 12, its pivoting axis 13 and its control jacks 14, the wheel 17 mounted for rotation at the free end of the double arm 12 via a shaft 22 on which it is secured. The frame 1 is provided with caterpillar tracks 23 and the transmission of the power for driving the tracks 23 and the wheel 17 is of the hydraulic type. Said transmission is constituted by the hydraulic motor 24 driving the tracks 23, and by the hydraulic motor 25 driving the wheel 17, said motors 24 and 25 being of the volumetric type and connected respectively to the pressurized fluid supply circuit via pipes 26, 27 and 28, 29. The Diesel engine 6 driving one or more pumps 30.

Figure 5:
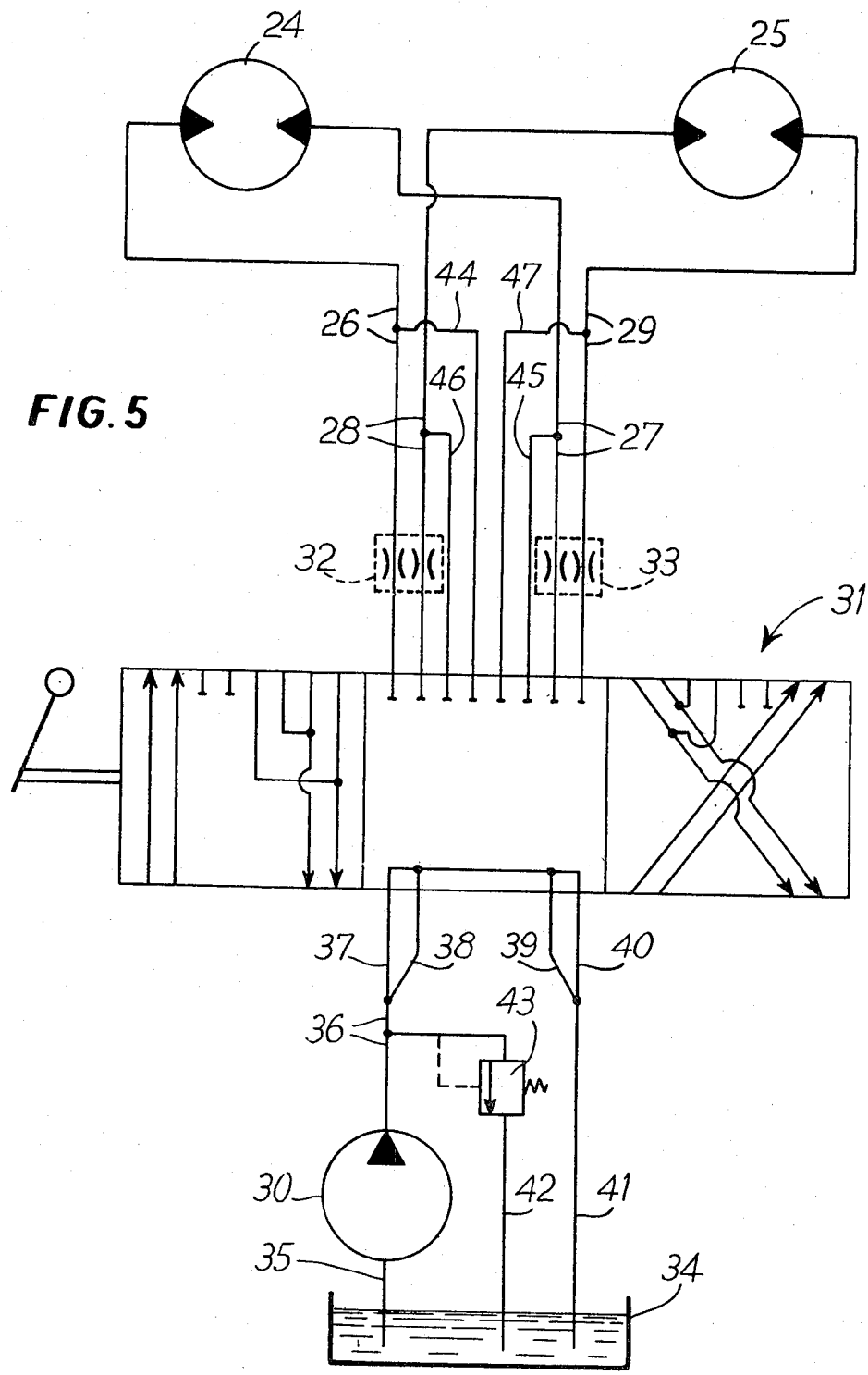
FIG. 5 is the diagram of the hydraulic circuit of the machine shown in FIGS. 3 and 4.

The supply circuit is shown in FIG. 5. The pipes 26, 27, 28, 29 lead to a three-position fluid distributor 31. Two flow dividers 32 and 33 are placed, respectively, on pipes 26, 28, and on pipers 27, 29. Also, the pump 30 is connected via its suction pipe 35 to a reservoir 34, and via its delivery pipe 36, to two pipes 37, 38 branched in parallel and connected to the distributor 31. Two other pipes 39, 40 connected to the distributor 31 are branched in parallel on a pipe 41 connected to the reservoir 34. A pipe 42 is connected in shunt to the delivery pipe 36 and is also connected to the reservoir 34, a discharge valve 43 being fitted on said pipe 42. In addition, pipes 44, 45, 46, 47 are connected to pipes 26, 27, 28 29, respectively, between the flow dividers 32, 33 and the motors 24, 25 and create a direct connection between said pipes and the distributor 31. Finally it should be noted that to simplify matters, only motor 24 is shown on the diagram of FIG. 5, although it is understood that more than one motor 24 may be supplied in parallel.

The three positions of the distributor 31 correspond:

the first position, to creating a communication between pipes 37 and 26, pipes 38 and 28, pipes 45 and 39, and pipes 47 and 40, and to stopping up pipes 44 and 46, the second position, to stopping up pipes 26, 27, 28, 29, 44, 45, 46 and 47, and to creating a communication between pipes 37, 38, 39, 40, and, the third position, to creating a communication between pipes 37 and 27, pipes 38 and 29, pipes 39 and 44, and pipes 40 and 46, and to stopping up pipes 45 and 47.

Figure 8:
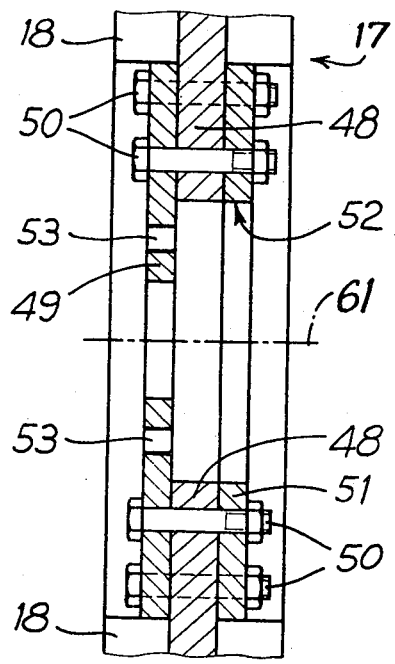
FIG. 8 is a view along section VIII—VIII of FIG. 7.
Figure 7:
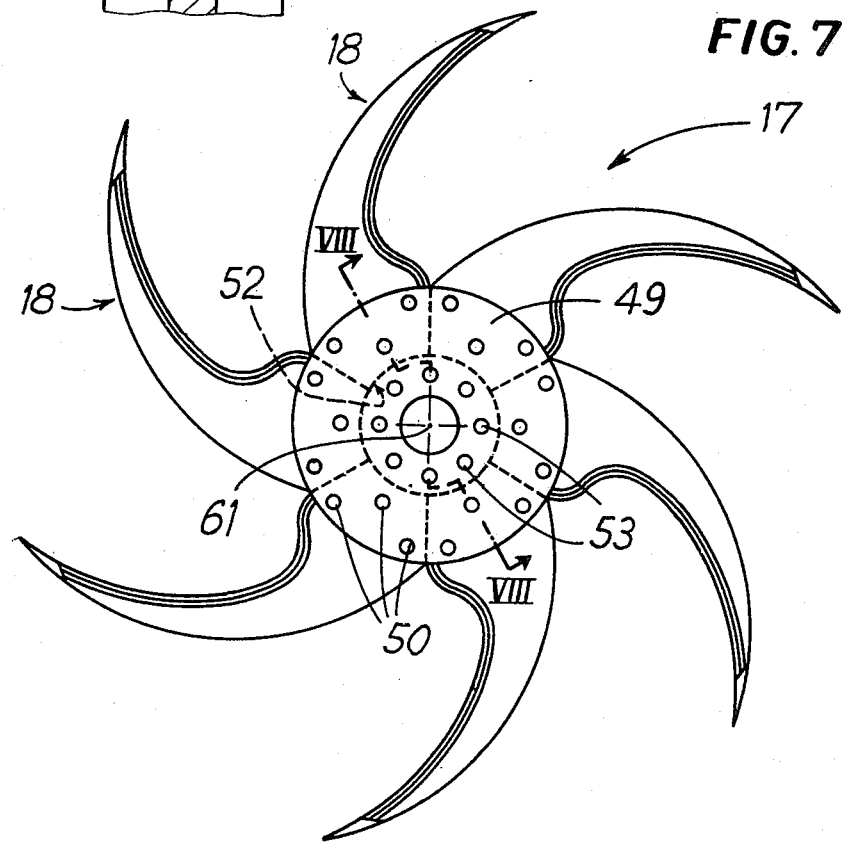
FIG. 7 is a side view of the wheel with which the machine shown in FIGS. 1 to 4 is equipped.

The wheel is more specifically illustrated in FIGS. 7 and 8. It is composed of a plurality of individual teeth 18, each one being provided with a tail piece 48 for fixing it on a plane disk 49 by means of bolts 50. A ring 51 for reinforcing the assembly is secured by means of the same bolts 50, said ring being placed on the side opposite to the disk 49 with respect to the fixing tails 48. Said reinforcement ring 51 is provided in its centre with a hollow portion 52, leaving uncovered and accessible the central part of the disk 49, which central part is provided with holes 53 for securing the wheel mounted on a driving shaft or any similar member.

Figure 9:
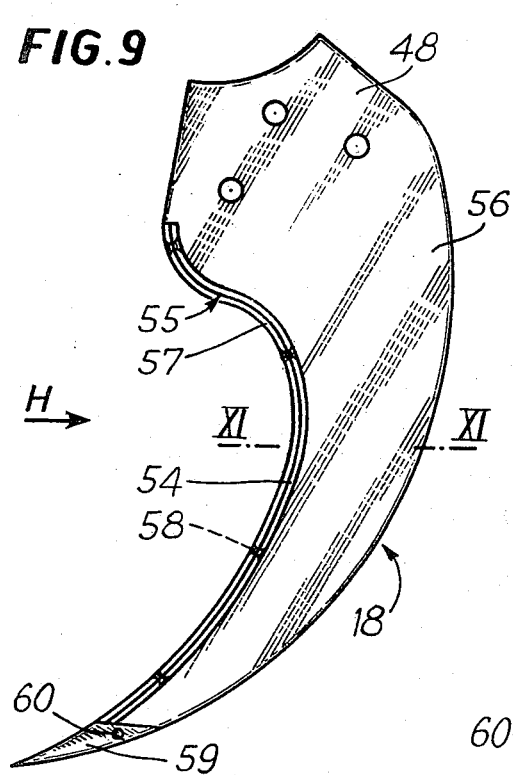
FIG. 9 is an elevational view of an individual tooth of the wheel shown in FIGS. 7 and 8.
Figure 11:
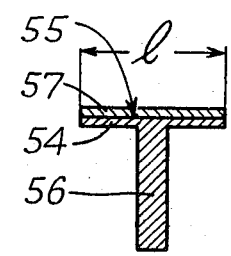
FIG. 11 is a section along XI—XI of FIG. 9.
Figure 10:
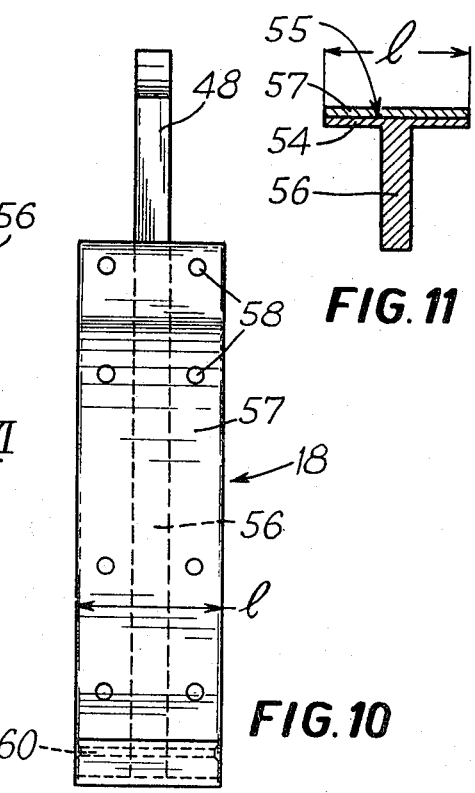
FIG. 10 is a view along arrow H of FIG. 9.

A tooth 18 is shown in FIGS. 9, 10 and 11. Its cross-section (FIG. 11) is T-shaped, the cross-stroke 54 of the T constituting the support of the active, or leading face 55 of the tooth, whilst the down-stroke 56 of the T constitutes the trailing tooth face or back rib of said support. The words "leading" and "trailing" are applied with respect to the rotational movement of each tooth. In conventional manner, the tooth is lined with replaceable wearing parts; these consist of a plate 57 protecting the active face 55, secured to the support 54 by screws 58, and, of a removable pointed end 59 secured by a pin 60. A fact to be noted is that the fixing tail 48 is but the extension of the rib 56. The surface of a cross-section of the tooth is preferably proportional to the factor ($1/\sqrt{R_o - r}$), $R_o$ and r being respectively, the maximum radius of the tooth with respect to the axis 61 of the wheel 17, and the polar radius of one point of the said cross-section. When said point is the end of the tooth, $r = R_o$, which is the real "maximum radius". It is often simple, as in the illustrated example, to keep the width l constant, and to select the thickness e of material of the cross-section to be proportional to the aforesaid factor. The optimal use of the material resulting from such a choice.

Figure 6:
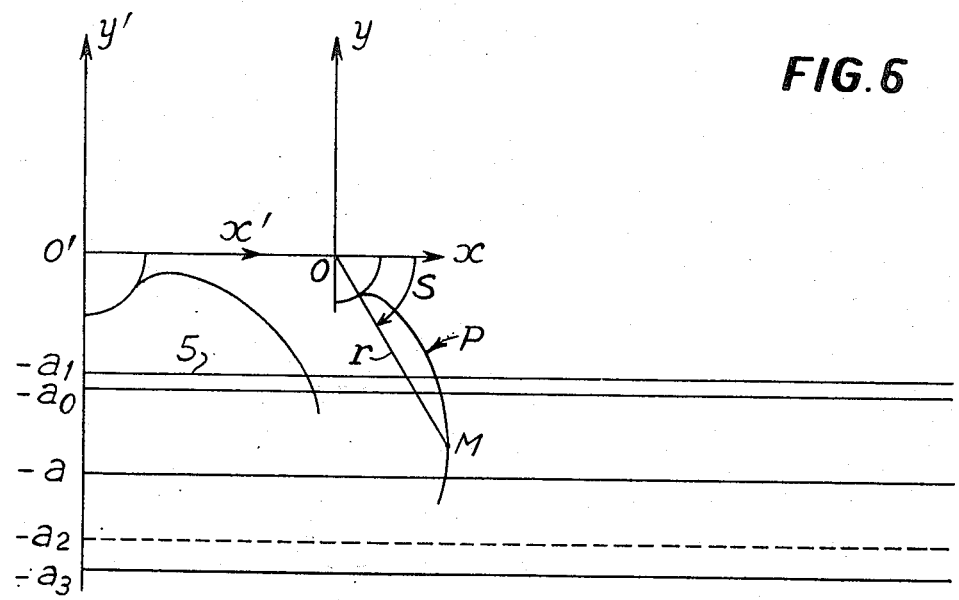
FIG. 6 is a diagram showing the profile of the active face of one tooth of the wheel of machines such as shown in FIGS. 1 and 2, or 3 and 4.

There now remains to define the profile of the active, or leading, face 55 of the tooth. FIG. 6 illustrates the definition of the profile according to the following method:

Taking M as to be a point of the ideal profile, whose polar coordinates are r (radius) and S (polar angle) in the mobile reference O x y.

The following are also defined:

a: desired rolling radius of the wheel, $a_3 = R_o$: maximal radius of the wheel, $(-a_1)$: ordinate of the surface of the ground 5, $(-a_0)$: ordinate of the lower surface defining the primary layer of hard ground, $(-a_2)$: ordinate of the ground layer above which all the ground has to be dug, W: angle of rotation of the wheel.

In the fixed reference O'x'y', the coordinates of the point M are:

$$x' = r \cos(S+W) - aW$$

$$y' = r \sin(S+W).$$

Whatever the profile P, the curve described by the pointed end of the tooth ($r = R_o$) is an invariable quantity. The origin of the angles is selected so that the polar angle of the tooth point is nil. The coordinates of the point M become:

$$x'_o = r \cos W - aW$$

$$y'_o = r \sin W.$$

Then a function has to be givein to the tooth. The primary function thus selected is to generate a pulling force, and the consequence of such a selection is to avoid that the portion of tooth situated in the zone of negative abscissae x be under pressure in the ground, and this for those points for which the abscissa x' increases at the same time as W. The condition is expressed as:

$$r \cos(W+S) - aW \geqq R_o \cos W_o - aW_o$$

for any S and W.

such as =
$$\begin{cases} R_o \sin W_o = r \sin(W+S) \\ R_o \sin W_o \geqq -a \end{cases}$$

hence:

$$W + S = \text{Arc sin}\,[(R_o/r) \times \sin W_o]$$

and:

$$aS\ R_o \cos W_o = aW_o + \text{Arc sin}$$

$$[(R_o/r) \times \sin W_o] - \sqrt{r^2 - R^2 \sin^2 W_o}$$

When r is chosen to be constant, for any $W_o$, minimal S is deduced from the study of the function:

$$F(r, W_o) = R_o \cos W_o - aW_o + a\,\text{Arc sin}\,[(R_o/r) \times \sin W_o] - \sqrt{r^2 - R_o^2 \sin^2 W_o}$$

to be noted: $F(R_o, W_o) \equiv 0$
Therefore:

$$\frac{\partial F(R_o, W_o)}{\partial W_o} = 0$$

$$\frac{\mu \partial^2 F(r, W_o)}{\partial W_o \partial r} \leq 0$$

Taking into account that: $r \leq R_o$, $$\frac{\partial F(r, W_o)}{\partial W_o} \geq 0$$

with $-\pi/2 \leq W_o \leq 0$
Then, for any $$W_o = \frac{\partial F(r, W_o)}{\partial W_o} \geq \frac{\partial F(R_o, W_o)}{\partial W_o} \geq 0$$

e.g.: $F(r, W_o) \leq F(r, W_{o1})$, with:
$W_o \leq W_{o1}$
$|W_{o1}|$ is chosen minimal, for a given $R_o$
Now, minimal $|W_{o1}|$ corresponds to the beginning of the penetration into the ground, and is thus defined by the equation:

$$R_o \sin W_{o1} = -a_o.$$

The expression of S then becomes:

$$S = S_o - \text{Arc sin}(a_o/r) - (\sqrt{r^2 - a_o^2})/a.$$

By putting down $r = a_o/\sin t$, with $t_o \leq t \leq \pi/2$, the result is:

$$S = S_o - t - (a_o/a) \times \text{ctg } t.$$

The polar equation of the profile P is then:

$$\begin{cases} r = a_o/\sin t \\ S = S_o - t - (a_o/a) \times \text{ctg } t \end{cases}$$

with $$\begin{cases} t_o \leq t \leq \pi/2 \\ R_o = a_o/\sin t_o. \end{cases}$$

This is in effect the active profile, which extends between the ordinates $-a_o$ and $-a_3(=-R_o)$.

Concerning the tooth portion situated between the ordinates varying between $-a_1$ and $-a_o$, the only points to be considered are those laid down by the Law on the strength of materials. The most simple profile is in this case the best one, and is given by $$S = S_o - \pi/2$$

(=constant) for $a_1 \leq r \leq a_o$.

The machines illustrated operate in a new and interesting way compared with to the known ones. Indeed, none of the known machines including a pulling wheel, designed as such, that is to say coupled in the first place to a driving device conferring to it a driving speed that is substantially synchronous with the driving speed of the main moving members of the machine. It was noted that, in the machines shown in the present application, the wheel 17 is designed to "roll" in the ground 5 with a rolling equal to a. It was also noted that the driving speeds of the main moving members (wheels 4 or caterpillar tracks 23) and of the wheel 17 are proportional, with a proportionality factor effectively ensuring the aforesaid synchronism. For this reason, on the one hand, the synchronism can only be approximated, by 10% for example, and the working kept satisfactory in practice, and on the other hand, when a certain mechanical "sliding" is allowed by the presence of a hydraulic converter for example, it is noted that the arrangements have a tendency to work in synchronism.

The driving speed ratio results, in conventional and obvious manner, from the choice, either of the gear ratios of the pinions 9 and 10 and of the transmission device 21 of the machine shown in FIGS. 1 and 2, or of the ratios of the output flows of each flow divider 32 and 33. Said flow dividers 32, 33 have of course been positioned so as to only cause the division of the supply flows to motors 24 and 25, without in any way impeding the elimination of the flow delivered by said motors. Previously known machines only used to be equipped with bucket wheels or the like, whose sole function was to make excavations.

Said function of excavation or to be more precise, in the case of the present invention, of ground loosening is also performed by the wheel 17 of the application. Indeed, the choice of the ordinate $(-a_2)$ is that of the depth of penetration of the teeth into the ground, down to the level where the ground has to be dug.

Of course, the choice, as described hereinabove, of the profile P of the active face 55 of each tooth is advantageous, in that, besides the "rolling" of the wheel 17, it allows a certain engagement of the teeth into the ground. In other words, the profile P facilitates the penetration and displacement of the teeth 18 into the ground and, as a result, prevents any loss of power in the member provided for driving the wheel 17. To sum up, it becomes possible, by choosing the profile P carefully, to set-in a relatively low power, hence to produce a machine at reasonable costs.

Finally, the actual production of a wheel 17, by means of separate teeth assembled on a single wheel disk, is easy and inexpensive.

The invention is not limited to the embodiments described hereinabove, but on the contrary covers any variants that can be made thereto without departing from its scope or its spirit.

What is claimed is:
1. A public works machine comprising:
a frame;
moving members, such as wheels or caterpillar tracks, on which said frame rests for forward movement on the ground,
drive means coupled to said moving members for driving said moving members,
a traction wheel provided with a plurality of teeth for penetration into the ground mounted for rotation about a substantially horizontal rotational axis extending transversely to the frame and the direction of travel of the machine, said traction wheel being coupled to power transmission means for drivingly rotating said traction wheel in the same direction as, and in constant speed synchronization with, said moving means to provide a reactive force between a leading face of each tooth of the traction wheel and the earth tending to cause forward movement of the machine, said traction wheel being positionable with respect to the frame by means of a support in a position in which the distance between the rotation axis of said traction wheel and the ground is less than the distance separating the rotation axis from the outer end of each tooth of the traction wheel, said power transmission means including synchronizing means for maintaining the ratio of the speed of rotation of the traction wheel to the speed of the moving members at a constant value so that the outer end of each tooth of said traction wheel has a linear speed which is substantially equal to the linear speed of forward movement provided by said moving members, wherein each tooth had a leading face and a trailing face with respect to its rotational movement and the profile of the leading face of each tooth is an involute profile resulting in a minimum amount of vertical force being exerted by said profile on the ground during the rotation of the wheel and penetration of the earth by each respective tooth so as to minimize the power required for penetrating the earth by each tooth.

2. A machine as claimed in claim 1, wherein the said profile has a cross-section defined by the following polar coordinates.

$$\begin{cases} r = a_o/\sin t \\ S = S_o - t - (a_o/a) \times ctg\ t \end{cases}$$

with:

t varying between $t_o$ and $]/2$;

$R_o = a_o/\sin t_o$ a: rolling radius without sliding of the wheel;

$a_o$: depth of the surface layer of the ground of hard materials;

$R_o$: maximum radius of the wheel;

r and S, respectively, polar radius and angle.

3. A machine as claimed in claim 2 wherein said traction wheel includes a wheel disk, a plurality of individual teeth extending outwardly from said wheel disk, annular ring means positioned adjacent the inner extent of said teeth for clamping said teeth against said wheel disk with said annular ring means having a central opening permitting access to the wheel disk enabling the coupling of the wheel disk to the driving means.

4. A machine as claimed in claim 3 additionally including means for adjusting the vertical position of the traction wheel with respect to the frame.

5. A machine as claimed in claim 4 wherein each tooth includes a removable pointed end portion separable from leading face of each tooth.

6. A machine as claimed in either claims 1 or 2 additionally including means for adjusting the vertical position of the traction wheel with respect to the frame.

7. A machine as claimed in either of claims 1 or 2 wherein each tooth includes a removable pointed end portion separable from the leading face of each tooth.

8. A machine as claimed in claim 1 wherein said traction wheel includes a wheel disk, a plurality of individual teeth extending with a radial component outwardly from said wheel disk, annular ring means positioned adjacent the inner extent of said teeth for clamping said teeth against said wheel disk with said annular ring means having a central opening permitting access to the wheel disk enabling the coupling of the wheel disk to the driving means.

9. A machine as claimed in claim 8 additionally including means for adjusting the vertical position of the traction wheel with respect to the frame.

10. A machine as claimed in claim 9 wherein each tooth includes a removable pointed end portion separable from leading face of each tooth.

* * * * *